US012546019B2

(12) United States Patent
Al-Sehemi et al.

(10) Patent No.: US 12,546,019 B2
(45) Date of Patent: Feb. 10, 2026

(54) ELECTROCATALYSTS FOR OXYGEN EVOLUTION REACTION AND METHOD OF FABRICATION THEREOF

(71) Applicants: King Khalid University, Abha (SA); SASTRA Deemed University, Nadu (IN)

(72) Inventors: Abdullah G. Al-Sehemi, Abha (SA); Pandi Muthukumar, Nadu (IN); Periyappan Nantheeswaran, Nadu (IN); Mariappan Mariappan, Nadu (IN); Savarimuthu Philip Anthony, Nadu (IN); Mehboobali Pannipara, Abha (SA)

(73) Assignees: King Khalid University, RCAMS, Abha (SA); SASTRA Deemed University, Tamil Nadu (IN)

( * ) Notice: Subject to any disclaimer, the term of this patent is extended or adjusted under 35 U.S.C. 154(b) by 585 days.

(21) Appl. No.: 18/058,517

(22) Filed: Nov. 23, 2022

(65) Prior Publication Data

US 2024/0167178 A1    May 23, 2024

(51) Int. Cl.
| | |
|---|---|
| *C25B 11/091* | (2021.01) |
| *C25B 1/02* | (2006.01) |
| *C25B 11/02* | (2021.01) |
| *C25B 11/052* | (2021.01) |
| *C25B 11/056* | (2021.01) |
| *C25B 11/065* | (2021.01) |

(52) U.S. Cl.
CPC ............ *C25B 11/091* (2021.01); *C25B 1/02* (2013.01); *C25B 11/02* (2013.01); *C25B 11/052* (2021.01); *C25B 11/056* (2021.01); *C25B 11/065* (2021.01)

(58) Field of Classification Search
CPC .............................. C25B 11/091; C25B 11/04
See application file for complete search history.

(56) References Cited

PUBLICATIONS

Shao, Mengmeng, et al. "Phase transition in V-doped cobalt hydroxide for a superior alkaline hydrogen evolution reaction." Chemical Communications 58.92 (2022): 12859-12862. (Year: 2022).*

Xie, Jing-Yi, et al. "Double doping of V and F on Co3O4 nanoneedles as efficient electrocatalyst for oxygen evolution." International Journal of Hydrogen Energy 46.38 (2021): 19962-19970. (Year: 2021).*

He, Jietong, et al. "Cathode electrochemically reconstructed V-doped CoO nanosheets for enhanced alkaline hydrogen evolution reaction." Chemical Engineering Journal 432 (2022): 134331. (Year: 2022).*

(Continued)

*Primary Examiner* — Luan V Van
(74) *Attorney, Agent, or Firm* — AVEK IP, LLC

(57) ABSTRACT

The present disclosure relates to V and F-codoped cobalt hydroxide nanowires electrocatalysts V—Co(OH)$_2$ comprises vanadium (V) at less stable 4+ oxidation state and fluoride (F) ions codoped directly on carbon cloth electrode. The V—Co(OH)$_2$ produces excellent oxygen evolution reaction (OER) activity in alkaline conditions. The present disclosure also relates to a method of fabrication of the V and F-codoped cobalt hydroxide nanowires electrocatalysts V—Co(OH)$_2$ comprising vanadium (V) at less stable 4+ oxidation state and fluoride (F) ions codoped directly on carbon cloth electrode by hydrothermal reaction.

8 Claims, 13 Drawing Sheets

(56) References Cited

PUBLICATIONS

Huang, Huiyong, et al. "Enhancing oxygen evolution reaction electrocatalytic performance with vanadium-doped Co/CoO encapsulated in carbon nanorod." Inorganic Chemistry Communications 103 (2019): 1-5. (Year: 2019).*

Wang, Xingzhao, et al. "Synthesis of V-doped urchin-like NiCo2O4 with rich oxygen vacancies for electrocatalytic oxygen evolution reactions." Electrochimica Acta 406 (2022): 139800. (Year: 2022).*

* cited by examiner

ELECTROCATALYSTS FOR OXYGEN EVOLUTION REACTION AND METHOD OF FABRICATION THEREOF

FIELD OF THE INVENTION

The present disclosure generally relates to the field of electrocatalyst and method of fabrication thereof. Specific embodiments relate to V and F-codoped β-Co(OH)$_2$ nanowires electrocatalysts. Specific embodiments also relate to a method of fabrication of the cobalt hydroxide (Co(OH)$_2$) nanowires electrocatalyst codoped with vanadium (V) at less stable 4+ oxidation state and fluoride (F) ions (V—Co(OH)$_2$) directly on carbon cloth electrode by hydrothermal reaction, and it's use for producing excellent oxygen evolution reaction (OER) activity in alkaline conditions.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

The challenges of energy crisis and serious environmental problems caused by fossil fuel prompted scientific exploration for finding alternative green energy sources. Hydrogen is considered as an ideal alternative fuel due to high energy density, sustainability and zero carbon emission. Electrochemical water splitting technology afforded a green and sustainable pathway to generate hydrogen energy. As an important electrochemical oxidation process, the oxygen evolution reaction (OER) displays the rate determining behavior of overall water splitting and also plays a key role for renewable energy conversion and storage devices including fuel and solar cells, and metal-air batteries. The four-electron transfer associated with OER for breaking O—H bond and making O—O bond compared to two electron mechanism of hydrogen evolution reaction (HER) necessitated large overpotential (i) for commercial electrocatalysts (nearly 0.8 V higher compared to thermodynamic threshold potential of 1.23 V) and reduced the overall water splitting efficiency.

So far, the precious metals such as Ru- and Ir-based materials are the most active OER catalysts; however, the high cost, scarcity and unsatisfactory durability limited their practical application. Alternatively, transition metals especially Fe, Co, Ni and Cu based materials have been explored intensively for electrocatalysis because of their multivalency promoted competitive activity and earth abundance. Particularly, cobalt hydroxides (Co(OH)$_2$) have attracted increased attention because of their environmental friendliness.

The fully occupied t$_{2g}$ orbitals of MO$_6$ center in Co(OH)$_2$ resulted in a low electron transfer conductivity that contributed to reduced OER activity. Nevertheless, incorporating other transition metal ions such as Fe, Ni and V into Co(OH)$_2$ host matrix modified the electronic properties and produced enhanced OER activity by synergistic effects between dopants and host metal ions. For example, Fe and B co-doped Co(OH)$_2$ ultrathin nanosheets exhibited improved OER activity (η=264 mV at 10 mA cm$^{-2}$) whereas Fe doped Co(OH)$_2$ nanosheets required very high overpotential of 295 mV in alkaline medium. Doping V that exhibits multivalent states (+3, +4 and +5) is expected to tune the electronic properties of Co(OH)$_2$ significantly, however the nanostructure morphologies and stability still pose limitation on exploiting their full potential. In spite of the tremendous effort, most of the reported transition metal based OER catalysts required at least 190 mV overpotentials to achieve the benchmark current density of 10 mA cm$^{-2}$.

Therefore, there remains an unmet need to develop OER electrocatalyst that is earth abundant, highly active, maintain optimal nanostructure morphologies and requires very low overpotential for achieving benchmark current density of 10 mA/cm$^2$.

OBJECTIVE OF THE INVENTION

An objective of the present invention is to provide an earth abundant electrocatalyst for oxygen evolution reaction OER.

Another objective of the present invention is to provide a method for the fabrication of an earth abundant OER electrocatalyst that maintains optimal nanostructure morphologies and requires low overpotential for achieving benchmark current density of 10 mA/cm$^2$.

SUMMARY OF THE INVENTION

The present invention in general relate to a highly active earth abundant nanowires electrocatalyst for oxygen evolution reaction OER.

In a specific aspect, the present invention provides a V and F-codoped β-Co(OH)$_2$ nanowires electrocatalyst comprising of vanadium (V) at less stable 4+ oxidation state and fluorine (F) ions codoped V—Co(OH)$_2$ nanowires directly on the carbon cloth electrode.

In an aspect, the present invention provides a V and F-codoped β-Co(OH)$_2$ nanowires electrocatalyst comprising of vanadium (V) at less stable 4+ oxidation state and fluorine (F) ions codoped V—Co(OH)$_2$ nanowires directly on the carbon cloth electrode that maintains optimal nanostructure morphologies, requires very low overpotential for achieving benchmark current density of 10 mA/cm$^2$ and strongly enhances OER activity.

In an aspect, the present invention provides V—Co(OH)$_2$ nanowires electrocatalysts possessing hybrid nanostructures comprising nanowires attached with spherical nano-assemblies, which provides high catalytic active sites with enhanced charge transport.

In an aspect, the present invention provides V—Co(OH)$_2$ nanowires electrocatalysts comprising higher valence V$^{4+}$ and strongly electronegative F in V—Co(OH)$_2$ and mixed state of cobalt (Co$^{2+}$/Co$^{3+}$), wherein Co$^{2+}$ is at higher ratio compared to Co$^{3+}$ that promotes OOH* intermediate generation and provides the outstanding OER activity.

In certain aspects, the present invention also relates to a method for production of the V and F-codoped V—Co(OH)$_2$ nanowires electrocatalyst by hydrothermal process and it's use for producing excellent oxygen evolution reaction (OER) activity in alkaline conditions.

In an aspect, the present invention relates to a method for fabrication of new V and F-codoped earth abundant cobalt hydroxide nanowires electrocatalysts directly on the carbon cloth electrode by hydrothermal reaction.

In an aspect of the present invention, the vanadium and fluorine codoped β-Co(OH)$_2$ nanowires are fabricated with less stable V$^{4+}$ state, fluorine in completely ionic state and mixed state of cobalt (Co$^{2+}$/Co$^{3+}$).

In another aspect of the present invention, the hydrothermal reaction temperature can be in the range of 0 to about 180° C.

In another aspect of the present invention, the hydrothermal reaction period can range from about 1 h to about 6 h.

In one aspect, the present invention relates to a method for fabrication of cobalt hydroxide ($Co(OH)_2$) nanowires codoped with vanadium (V) at less stable 4+ oxidation state and fluoride (F) ions directly on carbon cloth electrode by hydrothermal reaction, the method comprising: dissolving cobalt nitrate hexahydrate and urea in water and stirring for about 5 minutes to about 10 minutes at room temperature, adding ammonium metavanadate and 2 equivalent ammonium fluoride to the solution under stirring and heating the mixture in a pre-treated single side coated carbon cloth under pressure at a temperature in a range of about 120° C. to about 220° C. for a period of about 2 h to about 4 h, cooling the reaction solution to room temperature slowly and taking out carbon cloth and washing with water ethanol, and acetone to obtain V and F-codoped V—$Co(OH)_2$.

V—$Co(OH)_2$ nanowires synthesized at defined conditions produce excellent OER activity with ultralow overpotential of 136 mV at 10 mA $cm^{-2}$ (scan rate 1 m V/s), small Tafel slope (47.2 mV/dec) and good stability over 72 h.

Various objects, features, aspects and advantages of the inventive subject matter will become more apparent from the following detailed description of preferred embodiments.

DETAILED DESCRIPTION OF THE INVENTION

Figure 1:
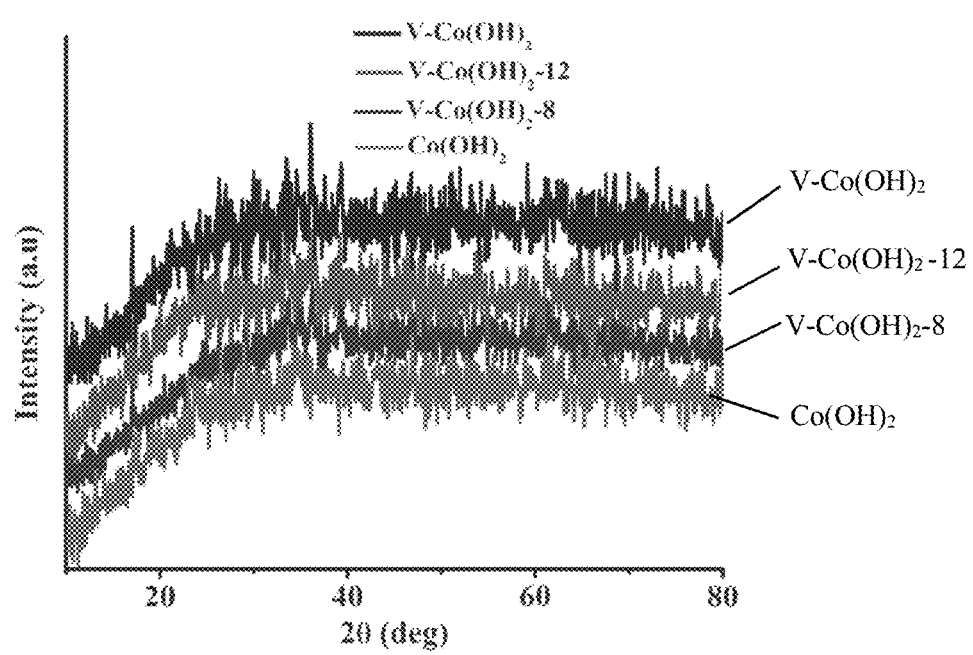
FIG. 1 illustrates the PXRD pattern of $Co(OH)_2$ and V—$Co(OH)_2$.

The following is a full description of the disclosure's embodiments. The embodiments are described in such a way that the disclosure is clearly communicated. The level of detail provided, on the other hand, is not meant to limit the expected variations of embodiments; rather, it is designed to include all modifications, equivalents, and alternatives that come within the spirit and scope of the current disclosure as defined by the attached claims. Unless the context indicates otherwise, the term "comprise" and variants such as "comprises" and "comprising" throughout the specification are to be read in an open, inclusive meaning, that is, as "including, but not limited to."

When "one embodiment" or "an embodiment" is used in this specification, it signifies that a particular feature, structure, or characteristic described in conjunction with the embodiment is present in at least one embodiment. As a result, the expressions "in one embodiment" and "in an embodiment" that appear throughout this specification do not necessarily refer to the same embodiment. Furthermore, in one or more embodiments, the specific features, structures, or qualities may be combined in any way that is appropriate.

Unless the content clearly demands otherwise, the singular terms "a," "an," and "the" include plural referents in this specification and the appended claims. Unless the content explicitly mandates differently, the term "or" is normally used in its broad definition, which includes "and/or."

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description are approximations that can vary depending upon the desired properties sought to be obtained by a particular embodiment. In some embodiments, the numerical parameters should be constructed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The recitation of ranges of values herein is merely intended to serve as a shorthand method of referring individually to each separate value falling within the range. Unless otherwise indicated herein, each individual value is incorporated into the specification as if it were individually recited herein.

All processes described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The headings and abstract of the invention provided herein are for convenience only and do not interpret the scope or meaning of the embodiments.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description that follows, and the embodiments described herein, is provided by way of illustration of an example, or examples, of particular embodiments of the principles and aspects of the present disclosure. These examples are provided for the purposes of explanation, and not of limitation, of those principles and of the disclosure.

It should also be appreciated that the present invention can be implemented in numerous ways, including as a system, a method or a device. In this specification, these implementations, or any other form that the invention may take, may be referred to as processes. In general, the order of the steps of the disclosed processes may be altered within the scope of the invention.

Various terms as used herein are shown below. To the extent a term used in a claim is not defined below, it should be given the broadest definition persons in the pertinent art have given that term as reflected in printed publications and issued patents at the time of filing.

In general embodiments, the present invention relates to a new highly active, earth abundant nanowires electrocatalyst for oxygen evolution reaction OER.

In a specific embodiment, the present disclosure provides a vanadium and fluorine codoped β-Co(OH)$_2$ nanowires electrocatalyst comprising of vanadium (V) at less stable 4+ oxidation state and fluorine (F) ions codoped β-Co(OH)$_2$ nanowires directly on the carbon cloth electrode. Synergistic effect of V$^{4+}$ and F$^-$ codoping of Co(OH)$_2$ nanowires strongly enhances OER activity.

The vanadium and fluorine codoped V—Co(OH)$_2$ nanowires electrocatalysts possess hybrid nanostructures comprising nanowires attached with spherical nano-assemblies, which provides high catalytic active sites with enhanced charge transport. Nanowires act as good 1D electron transporting whereas spherical nano assemblies provided higher catalytically active sites.

The vanadium and fluorine codoped V—Co(OH)$_2$ nanowires electrocatalyst of the present disclosure comprising vanadium (V) at less stable 4+ oxidation state, fluorine (F) in completely ionic state possesses mixed state of cobalt (Co$^{2+}$/Co$^{3+}$), wherein, Co$^{2+}$ is at a higher ratio as compared to Co$^{3+}$ that promotes OOH* intermediate generation and provides the outstanding OER activity.

The V—Co(OH)2 electrocatalyst of the present disclosure produce low Tafel slope and charge transfer resistance that contributes enhanced OER activity.

The V—Co(OH)2 electrocatalyst of the present disclosure requires very low overpotential for achieving benchmark current density of 10 mA/cm$^2$ and strongly enhances OER activity.

The V—Co(OH)2 electrocatalyst of the present disclosure exhibits oxygen evolution reaction (OER) activity in alkaline conditions at pH 14.0.

The V—Co(OH)2 electrocatalyst of the present disclosure exhibits higher mass activity compared to undoped catalysts.

The V—Co(OH)2 electrocatalyst of the present disclosure has excellent stability over 72 h.

In certain embodiments, the present disclosure provides a method for production of the electrocatalyst by hydrothermal reaction.

In one embodiment, the present disclosure provides a method for fabrication of new, earth abundant cobalt hydroxide nanowires electrocatalysts directly on the carbon cloth electrode by hydrothermal reaction.

In an embodiment, The V and F-codoped V—Co(OH)$_2$ is synthesized hydrothermally by treating cobalt and vanadium precursors in presence of urea and ammonium fluoride along with a piece of carbon cloth under defined conditions.

The method for fabrication of the V and F-codoped V—Co(OH)$_2$ by hydrothermal reaction in accordance with the present disclosure is a single step process.

The hydrothermal reaction temperature can be in the range of 0 to about 180° C. The hydrothermal reaction period can range from about 1 h to about 6 h. Hydrothermal reaction can be carried out with pure solids as well as in dissolved state in aqueous solvent. Vanadium can be used at a concentration of about 6% to about 12 by wt. %.

In an embodiment, the present disclosure provides a method for fabrication of V and F-codoped V—Co(OH)$_2$ nanowires electrocatalyst comprising of vanadium (V) at less stable 4+ oxidation state and fluorine (F) in ionic state, in which method comprises hydrothermally treating cobalt and vanadium precursors in presence of urea and ammonium fluoride along with a piece of carbon cloth at 120° C. to 220° C. for 1 h to 6 h.

In one embodiment, the present invention relates to a method for fabrication of cobalt hydroxide (Co(OH)$_2$) nanowires codoped with vanadium (V) at less stable 4+ oxidation state and fluoride (F) ions directly on carbon cloth electrode by hydrothermal reaction, the method comprising: dissolving cobalt nitrate hexahydrate and urea in water and stirring for about 5 minutes to about 10 minutes at room temperature, adding ammonium metavanadate and 2 equivalent ammonium fluoride to the solution under stirring and heating the mixture in a pre-treated single side coated carbon cloth under pressure at a temperature in a range of about 120° C. to about 220° C. for a period of about 2 h to about 4 h, cooling the reaction solution to room temperature slowly and taking out carbon cloth and washing with water ethanol, and acetone to obtain V and F-codoped V—Co(OH)$_2$.

In one embodiment, the ammonium metavanadate is used at a concentration of about 6% to about 12 by wt. %.

The V and F-codoped V—Co(OH)$_2$ nanowires electrocatalyst provided in accordance with the present disclosure comprising vanadium (V) at less stable 4+ oxidation state and fluorine (F) in completely ionic state maintains optimal nanostructure morphologies, requires very low overpotential for achieving benchmark geometric current density of 10 mA/cm$^2$ and strongly enhances OER activity.

In certain embodiment, the present disclosure provides use of V and F-codoped V—Co(OH)$_2$ nanowires electrocatalyst for producing excellent oxygen evolution reaction (OER) activity in alkaline conditions for example at pH=14.0.

While the foregoing describes various embodiments of the disclosure, other and further embodiments of the disclosure may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

EXAMPLES

The present invention is further explained in the form of the following examples. However, it is to be understood that the following examples are merely illustrative and are not to be taken as limitations upon the scope of the invention.

Example 1

Synthesis of V and F-codoped V—Co(OH)$_2$ Electrocatalyst

Cobalt nitrate hexahydrate (1 mmol) and urea (3 mmol) were dissolved in water and stirred for 10 min at room temperature. To this solution, 10 wt % (with respect to cobalt nitrate) ammonium metavanadate and 2 equivalent ammonium fluoride were added. After stirring for 1 h, the reaction solution was transferred into a 50 mL Teflon-lined stainless-steel autoclave and a pre-treated single side coated carbon cloth (1×0.5 cm) was immersed into the solution. The set-up was sealed, heated to 180° C. and held at that temperature for 3 h. This precursor ratio and reaction time provided the best active OER catalyst. The reaction solution was allowed to cool to room temperature slowly and carbon cloth was taken-out and was washed with water ethanol, and acetone.

Comparative undoped Co(OH)$_2$ on carbon cloth was also synthesized following the same method but without using ammonium metavanadate.

No product formation observed without urea for both doped and undoped reaction.

TABLE 1

Different V—Co(OH)$_2$ Catalysts

| Catalysts | Concentration of ammonium metavanadate/ Reaction time |
|---|---|
| Co(OH)$_2$ | Synthesized without using ammonium metavanadate/ Reaction time 3 h. |
| V—Co(OH)$_2$ | 10 wt. % (with respect to cobalt nitrate) ammonium metavanadate/Reaction time 3 h. |
| V—Co(OH)$_2$-6 | 6 wt. % (with respect to cobalt nitrate) ammonium metavanadate/Reaction time 3 h. |
| V—Co(OH)$_2$-8 | 8 wt. % (with respect to cobalt nitrate) ammonium metavanadate/Reaction time 3 h. |
| V—Co(OH)$_2$-12 | 12 wt. % (with respect to cobalt nitrate) ammonium metavanadate/Reaction time 3 h. |
| V—Co(OH)$_2$-2 h | 10 wt. % (with respect to cobalt nitrate) ammonium metavanadate/Reaction time 2 h. |
| V—Co(OH)$_2$-4 h | 10 wt. % (with respect to cobalt nitrate) ammonium metavanadate/Reaction time 4 h. |

Example 2

PXRD Studies

Powder X-ray diffraction (PXRD) of Co(OH)$_2$ as well as V—Co(OH)$_2$ catalysts was measured. PXRD of Co(OH)$_2$ and V—Co(OH)$_2$ catalysts showed only weak diffraction peaks (FIG. 1). The diffraction peaks at 2θ 17.01, 33.5, 36.81 and 59.01 perfectly matched with 101, 100, 101 and 110 facets of hexagonal brucite-like structure of β-Co(OH)$_2$ phase (JCPDS file No. 74-1057). Hence, PXRD of undoped and doped Co(OH)$_2$ clearly suggested the formation of cobalt hydroxide nanostructures.

Example 3

Morphological Studies

Figure 2:
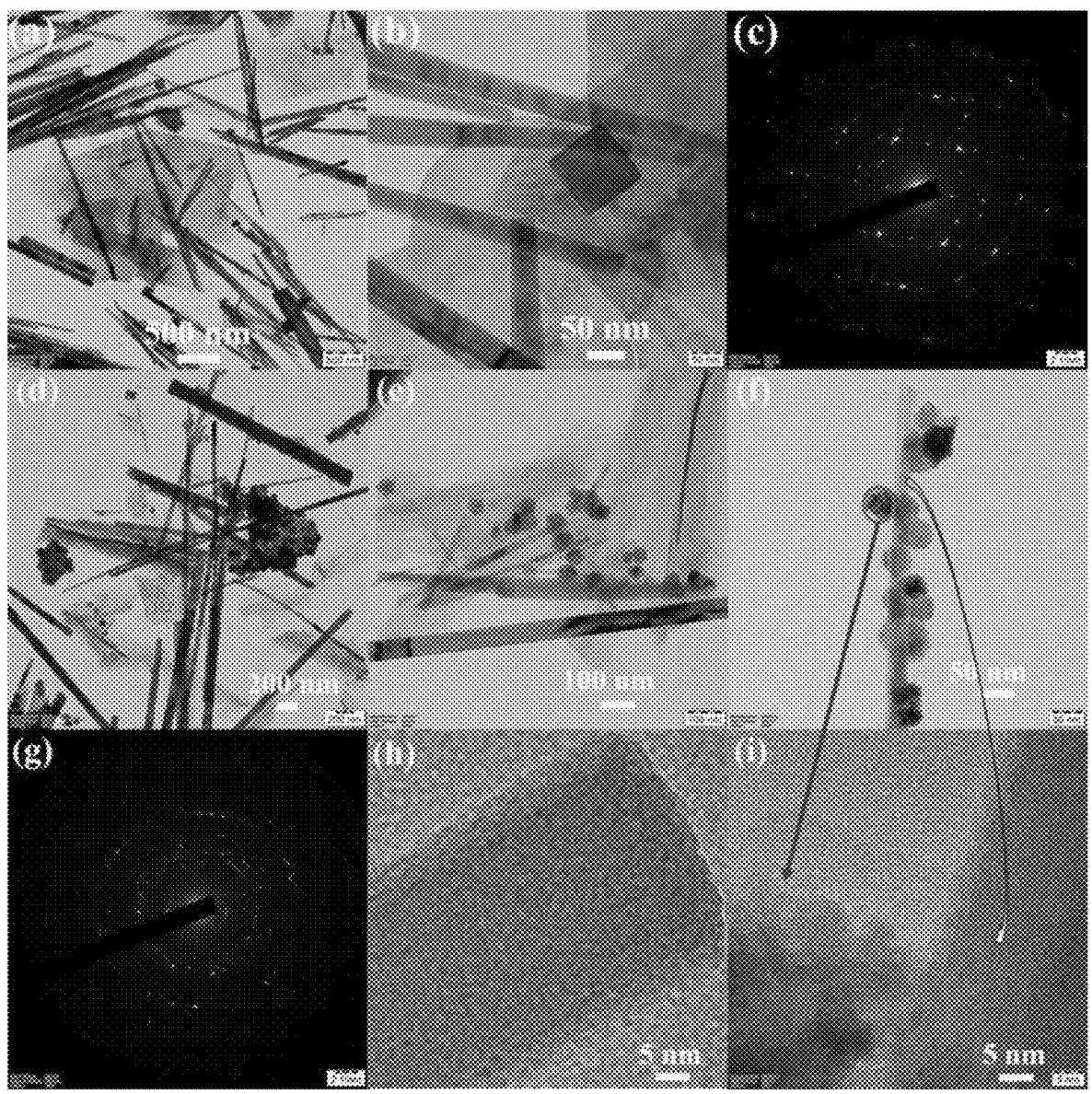
FIG. 2 illustrates HR-TEM images (a)-(b) of $Co(OH)_2$, (d)-(f) of V—$Co(OH)_2$; SAED pattern (c) of $Co(OH)_2$ and (g) of V—$Co(OH)_2$; and lattice fringe pattern (h), (i) of (a)-(c) $Co(OH)_2$ and (d)-(g) of V—$Co(OH)_2$ respectively.

High-resolution transmission electron microscopic (HR-TEM) analysis of Co(OH)$_2$ showed the formation of highly crystalline nanowires (diameter H 50 nm, length=few μm) (FIGS. 2(a)-(b)) and Selected area diffraction (SAED) pattern showed polycrystalline nature (FIG. 2(c)). V—Co(OH)$_2$ catalyst also exhibited nanowires morphology with nearly similar diameter and length seen from (HR-TEM) image (FIG. 2(d)). However, (HR-TEM) images of V—Co(OH)$_2$ further showed spherical assembly of nanoparticles formation along with nanowires (FIGS. 2(e), (f)). The spherically assembled nanoparticles were sticking on the surface of nanowires.

Figure 3:
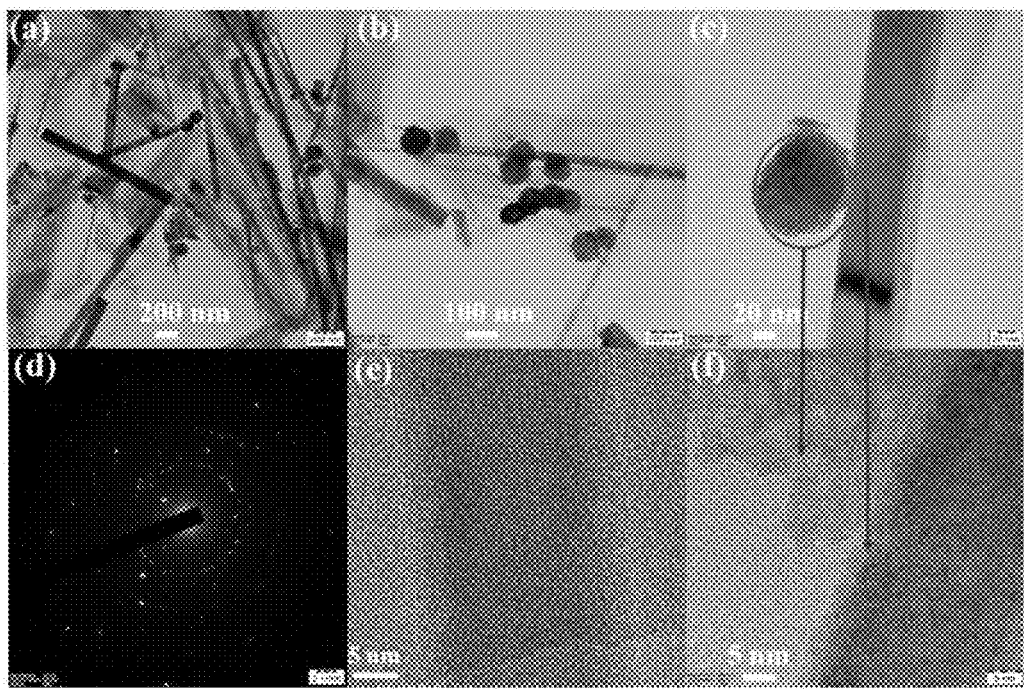
FIG. 3 illustrates HR-TEM images (a)-(c), SAED pattern (d) and lattice fringe pattern (e), (f) of V—$Co(OH)_2$-8.
Figure 4:
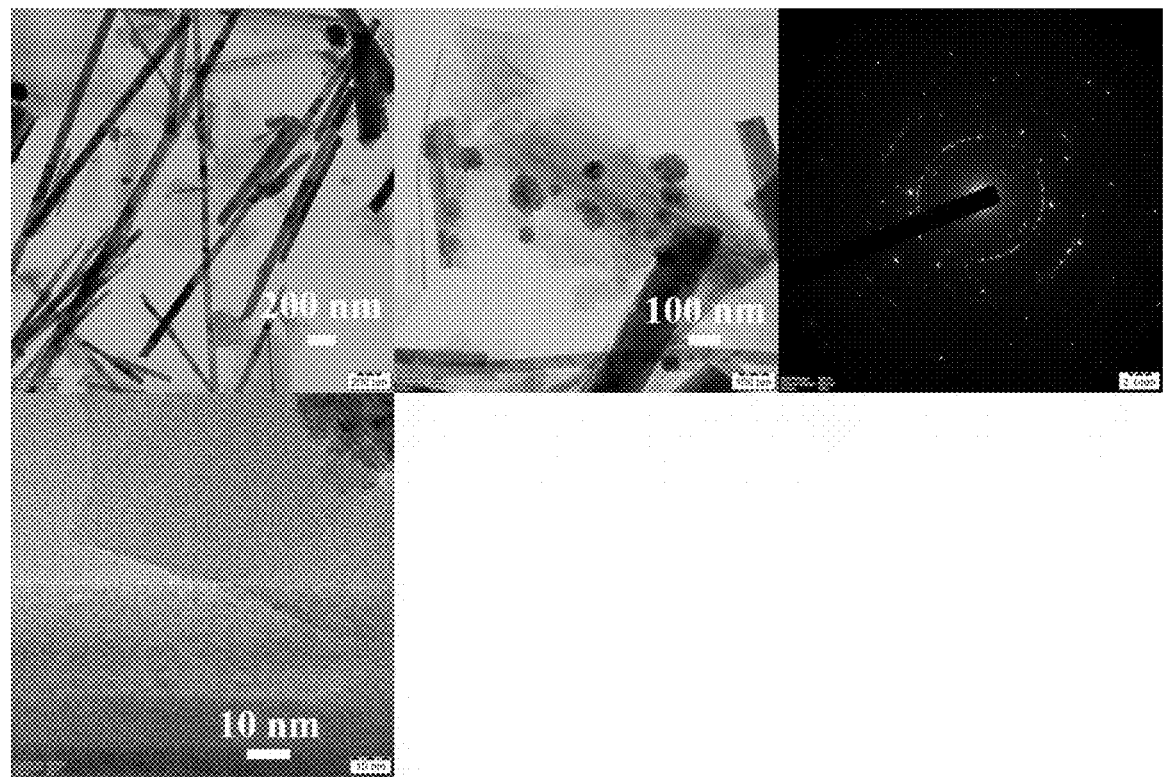
FIG. 4 illustrates HR-TEM, SAED pattern and lattice fringe pattern images of V—$Co(OH)_2$-12.

Selected area diffraction (SAED) pattern of V—Co(OH)$_2$ also indicated the polycrystalline nature of the nanowires (FIG. 2(g)). The lattice fringe pattern of nanowires showed similar orientation whereas spherical nano assemblies showed multiple orientation (FIGS. 2(h), (i)). V—Co(OH)$_2$-8 and V—Co(OH)$_2$-12 showed similar nanowire formation along with spherical assembly of nanoparticles (FIGS. 3 and 4). The SAED pattern revealed the polycrystalline nature of the nanowires and the lattice fringe image showed multiple smaller crystallites in the spherical assembly by showing different lattice orientation whereas nanowires adopted similar side orientation. V—Co(OH)$_2$-2 h showed the formation of polycrystalline nanowires along with spherical assembly of nanoparticles (FIGS. 5(a), (b)). SAED pattern and lattice fringe images indicated the formation of polycrystalline nanowires along with spherical assembly of nanoparticles (FIGS. 5(c), 6(a), (b)). Nanowires appeared to be broken into smaller nanorods and featureless nanoparticles along with spherical assembly of nanoparticles in V—Co(OH)$_2$-4 h (FIGS. 5(d), (e)). SAED pattern indicated polycrystalline nanoparticles formation and lattice fringe images confirmed multiple crystals aggregation (FIGS. 5(f), 6(c), (d)).

Figure 5:
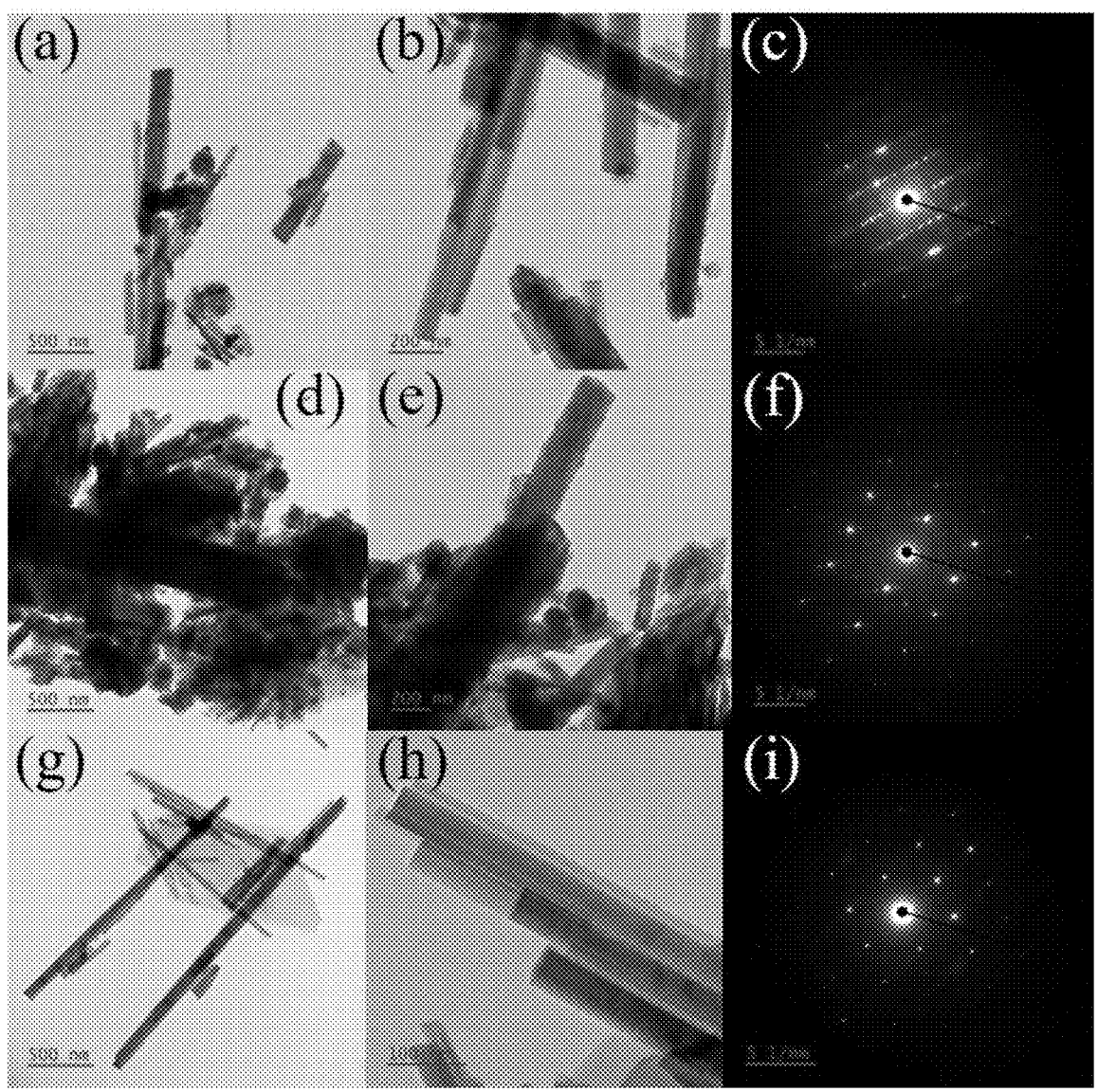
FIG. 5 illustrates HR-TEM images (a-b, d-e and g-h) and SAED pattern (c), (f), (i) of (a)-(c) V—$Co(OH)_2$-2 h, (d)-(f) V—$Co(OH)_2$-4 h and (g)-(i) V—$Co(OH)_2$ without $NH_4F$.
Figure 6:
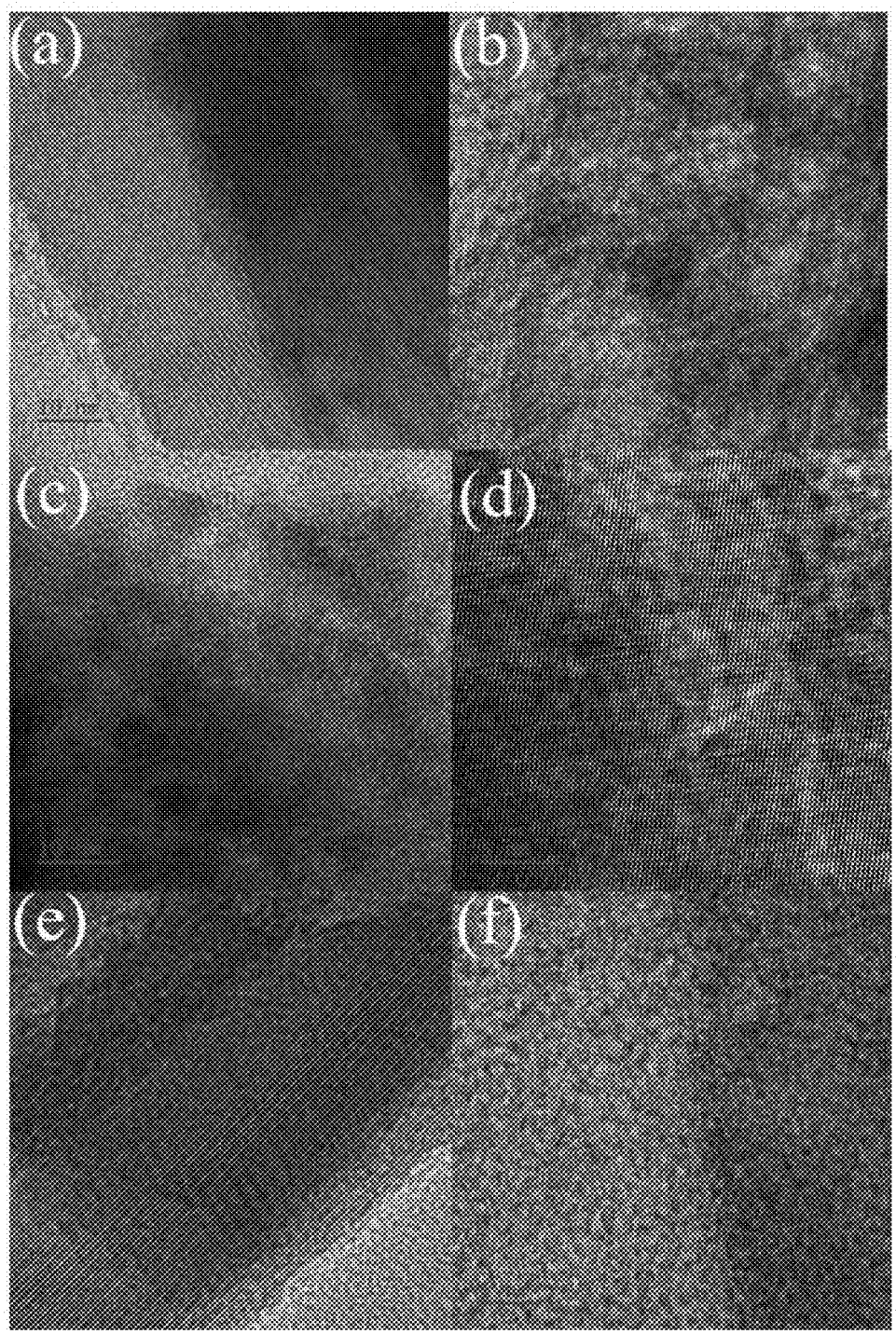
FIG. 6 illustrates lattice fringe pattern images of (a), (b) V—$Co(OH)_2$-2 h, (c), (d) V—$Co(OH)_2$-4 h and (e), (f) V—$Co(OH)_2$ prepared without using $NH_4F$.

V—Co(OH)$_2$ fabricated without using NH$_4$F showed the formation of clear nanowires with H 50 nm diameter and few μm length but without spherical assembly of nanoparticles (FIGS. 5(g), (h)). Only broken species of nanowires are seen without any spherical assemblies of nanoparticles. SAED pattern indicated the formation of single crystalline nanowires and lattice fringes indicated similar side orientation (FIGS. 5(i), 6(e), (f)).

Figure 7:
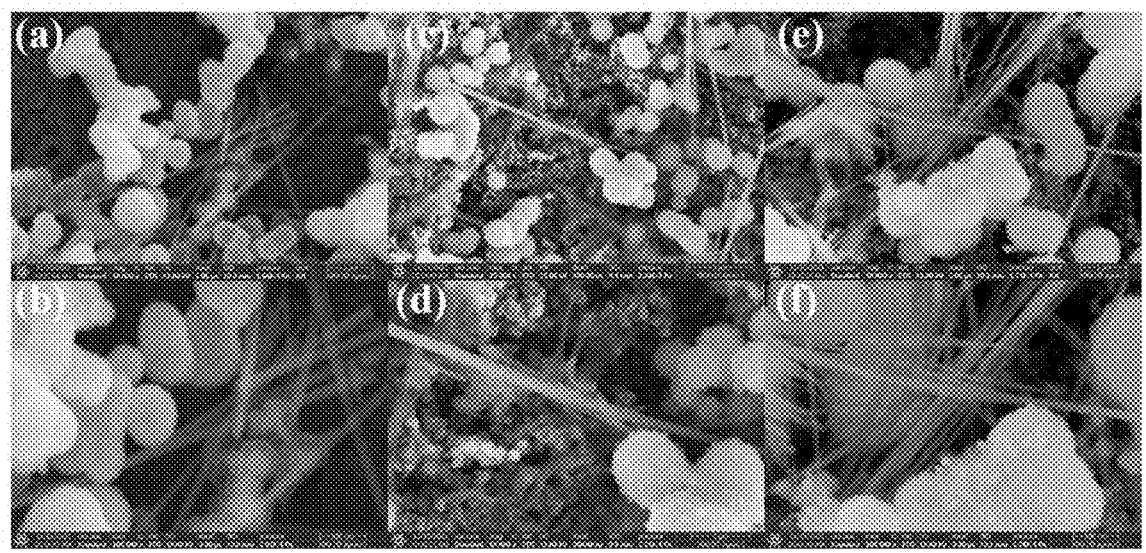
FIG. 7 illustrates FE-SEM images of (a), (b) V—$Co(OH)_2$, (c), (d) V—$Co(OH)_2$-8 and (e), (f) V—$Co(OH)_2$-12.

FE-SEM images also supported the formation of nanowires along with spherical nano assembly in V—Co(OH)$_2$, V—Co(OH)$_2$-8 and V—Co(OH)$_2$-12 (FIG. 7).

Example 4

Chemical Element and State Analysis

Figure 8:
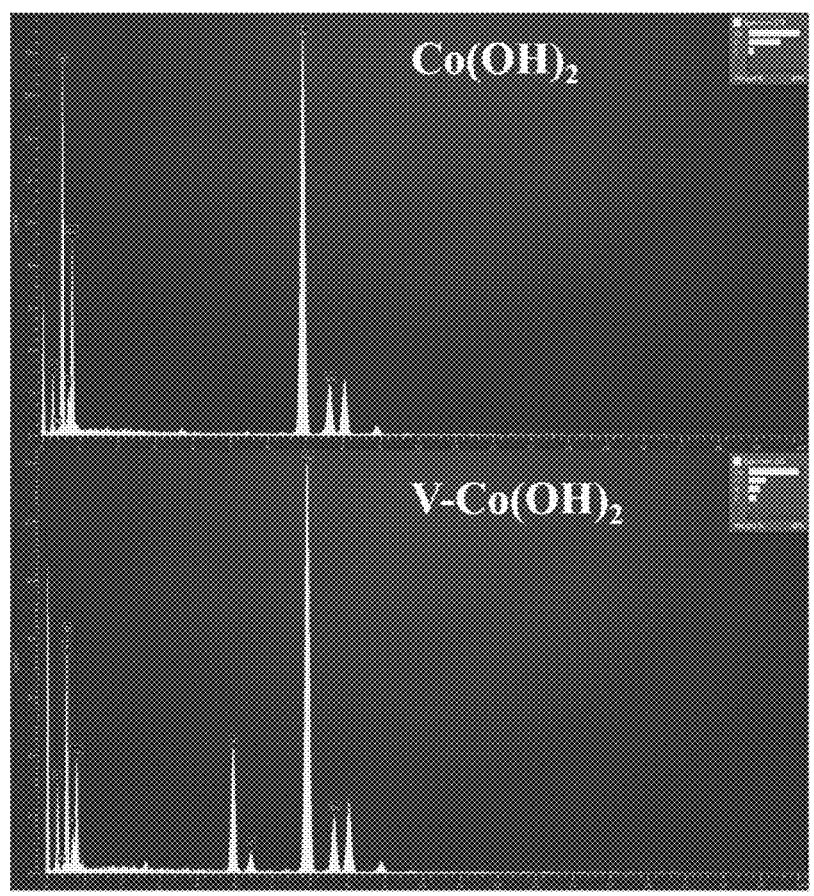
FIG. 8 illustrates the EDX graph of $Co(OH)_2$ and V—$Co(OH)_2$.
Figure 9:
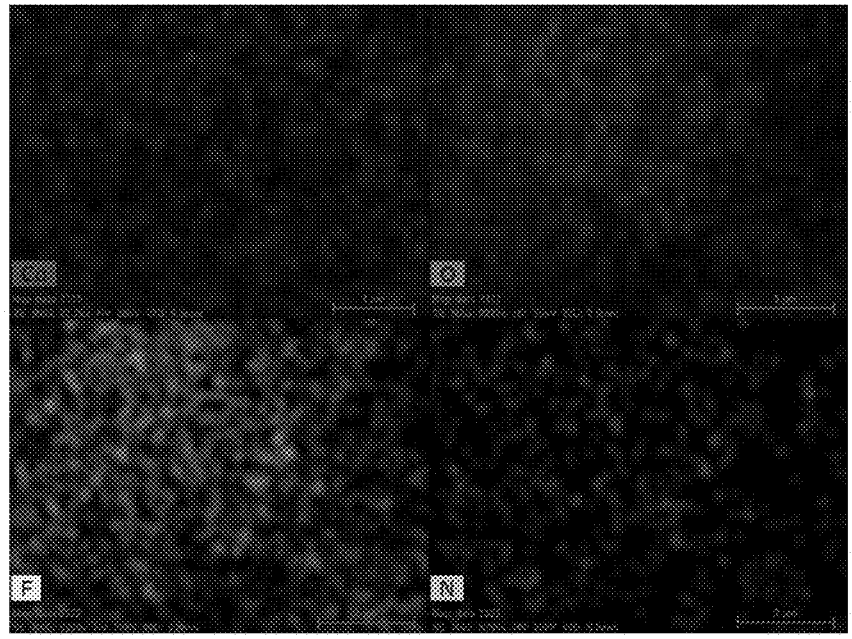
FIG. 9 illustrates elemental mapping of $Co(OH)_2$.
Figure 10:
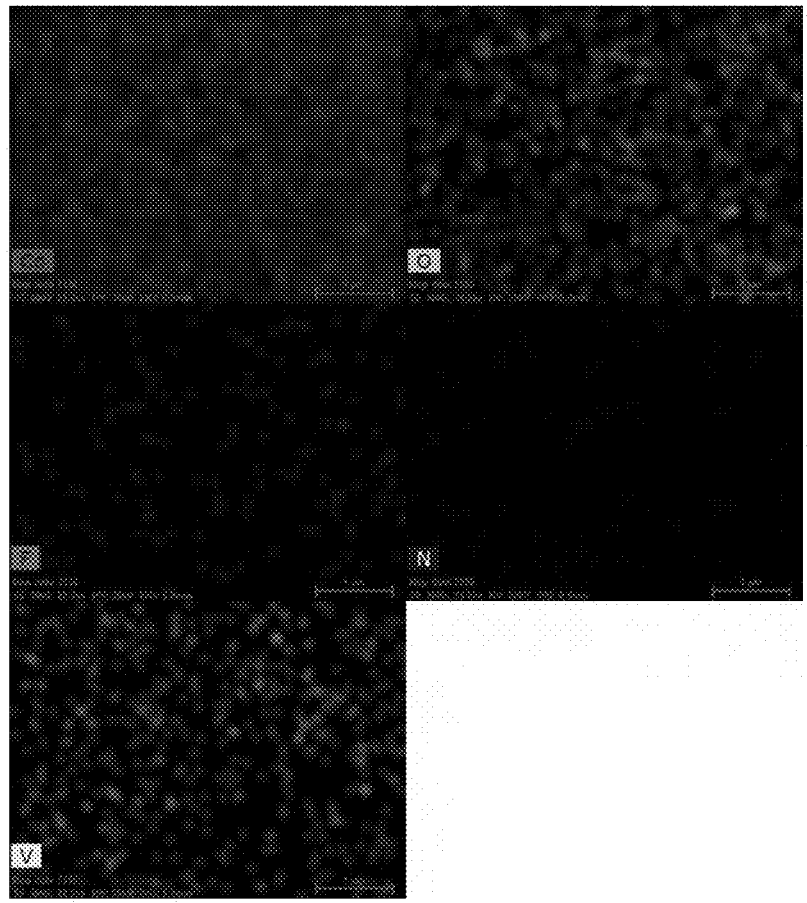
FIG. 10 illustrates elemental mapping of V—$Co(OH)_2$.

EDX analysis and elemental mapping of V—Co(OH)$_2$ confirmed the presence of Co, O, N, F and V as well as distribution of dopants uniformly in the nanostructures (FIGS. 8 and 9). Co(OH)$_2$ showed absence of V but presence of Co, O, N and F in the nanowires (FIGS. 8 and 10).

Figure 11:
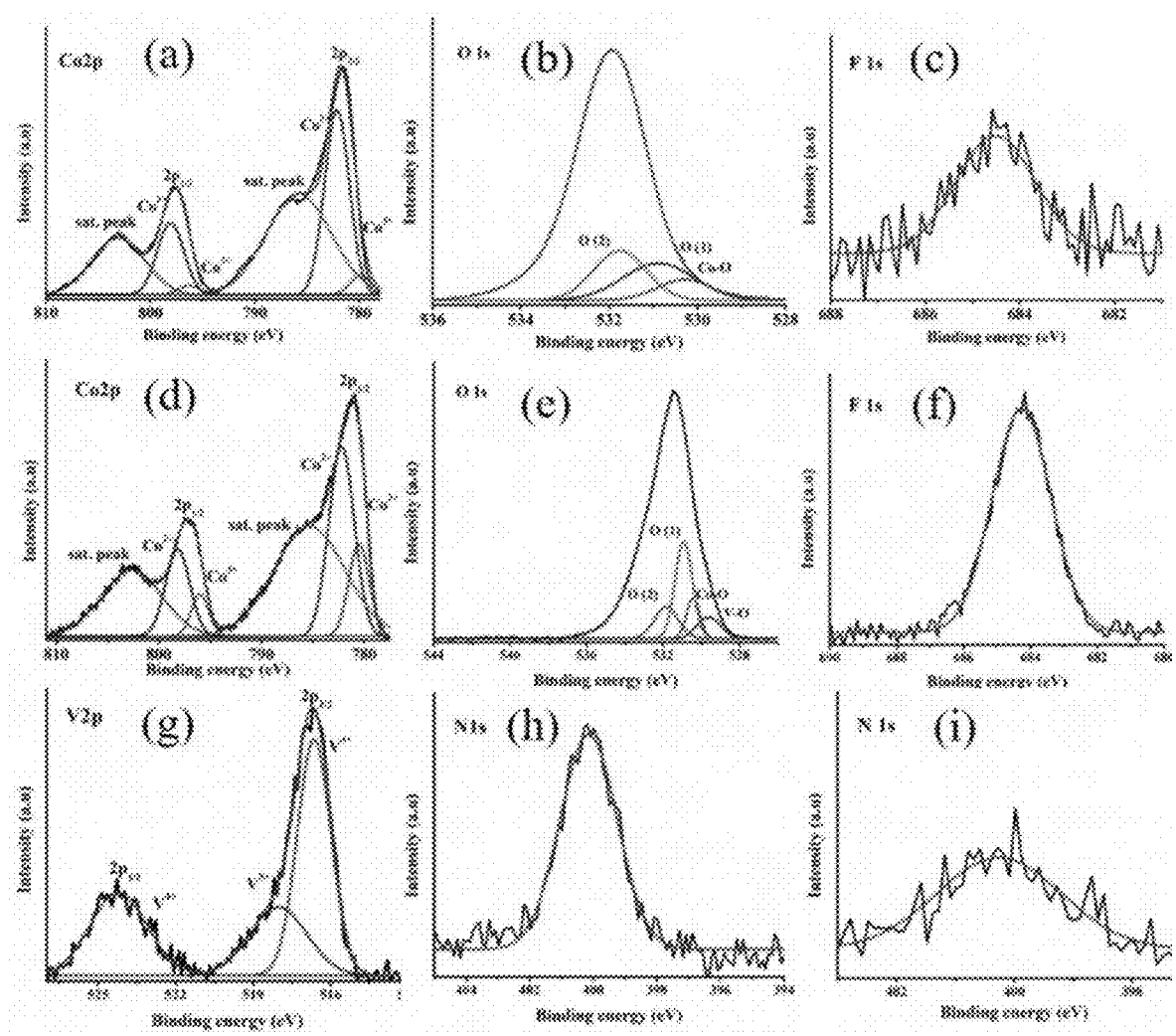
FIG. 11 illustrates the high-resolution XPS spectra of Co 2p, O 1s, F 1s, V 2p and N 1s in (a)-(c), (i) $Co(OH)_2$ and (d)-(h) V—$Co(OH)_2$.
Figure 12:
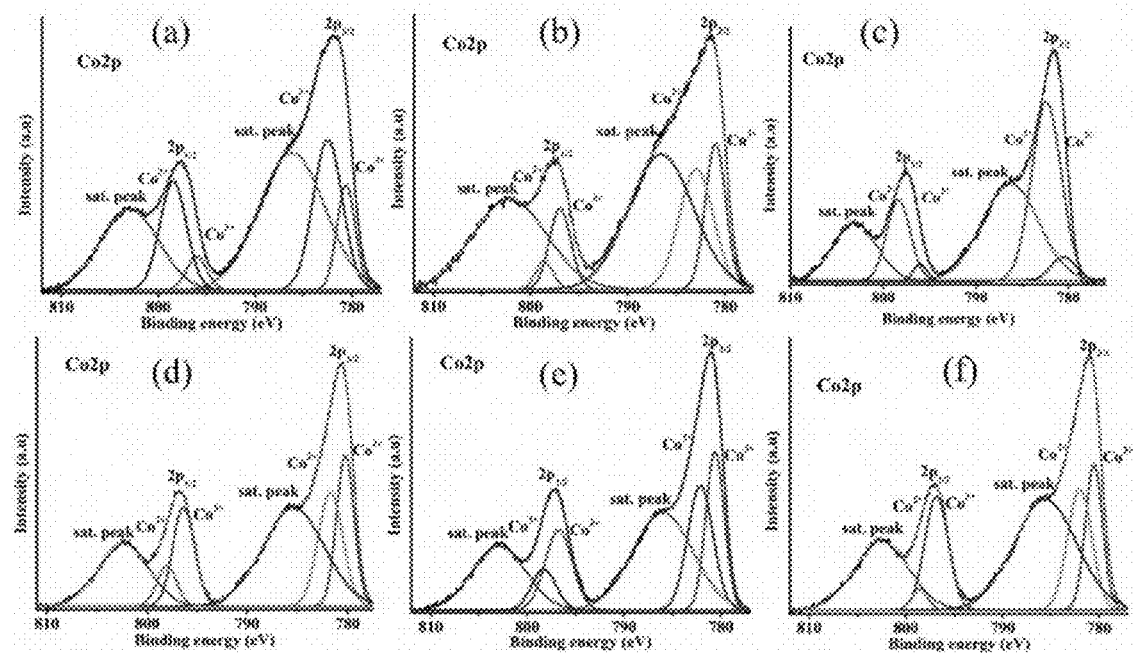
FIG. 12 illustrates the high-resolution XPS spectra of Co 2p in (a) V—$Co(OH)_2$-8, (b) V—$Co(OH)_2$-12, (c) V—$Co(OH)_2$-2 h, (d) V—$Co(OH)_2$-4 h, (e) V—$Co(OH)_2$ without $NH_4F$ and (f) V—$Co(OH)_2$ with NaF.
Figure 13:
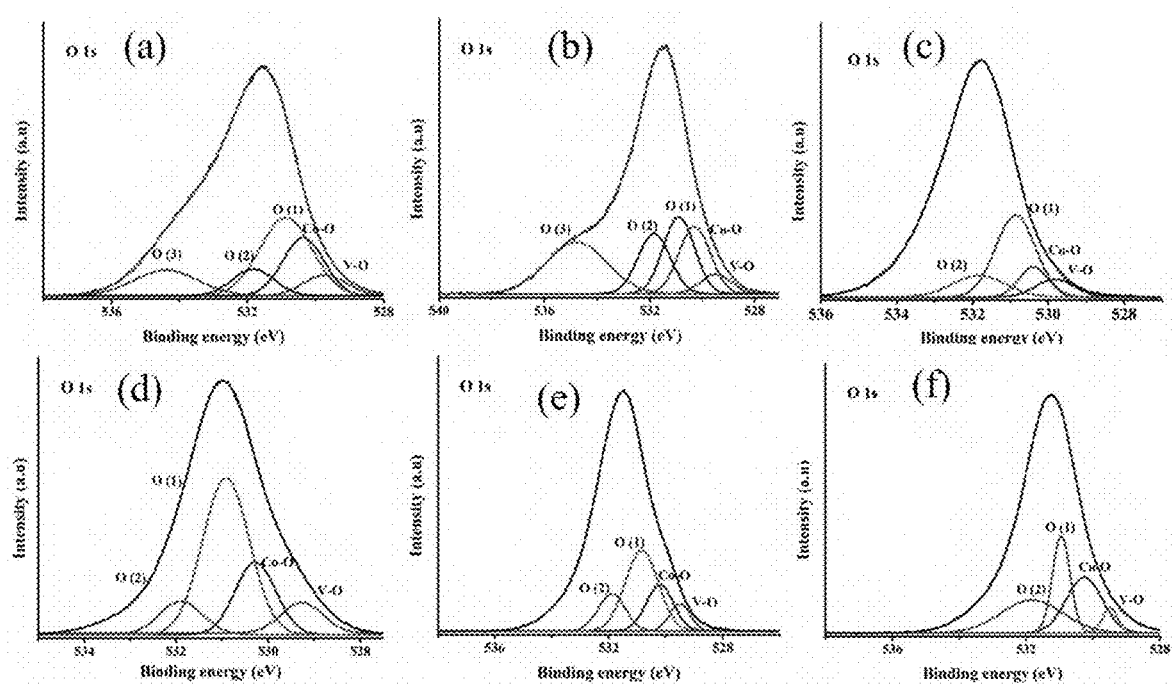
FIG. 13 illustrates the high-resolution XPS spectra of 0 is in (a) V—$Co(OH)_2$-8, (b) V—$Co(OH)_2$-12, (c) V—$Co(OH)_2$-2 h, (d) V—$Co(OH)_2$-4 h, (e) V—$Co(OH)_2$ without $NH_4F$ and (f) V—$Co(OH)_2$ with NaF.
Figure 14:
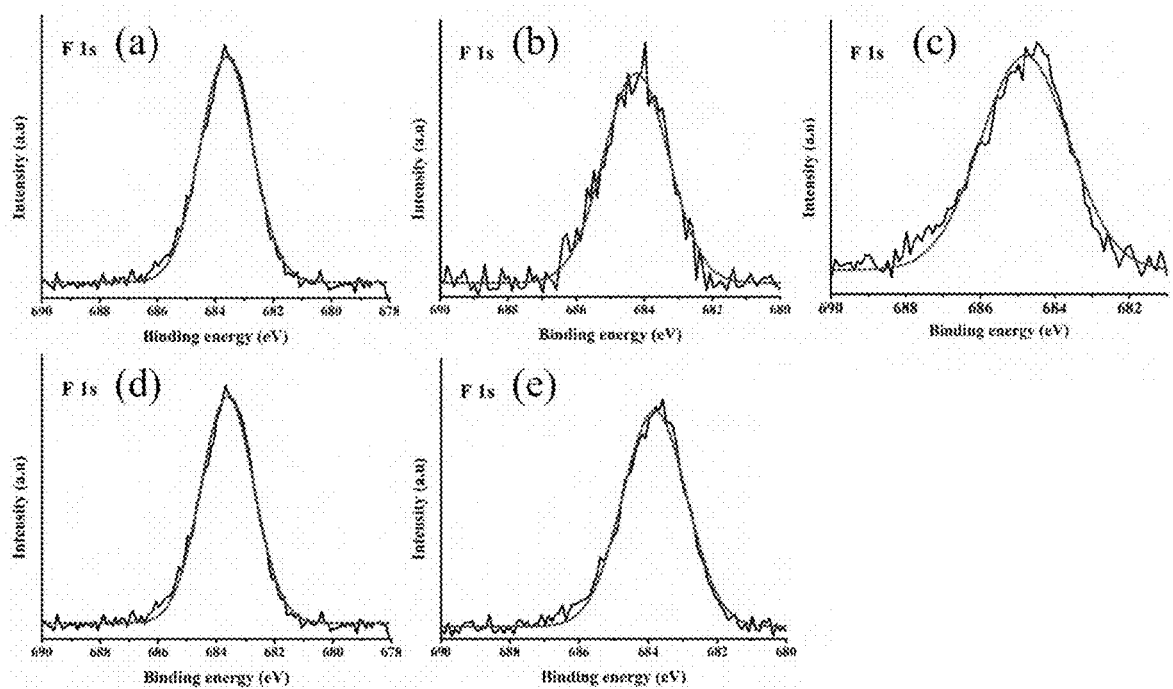
FIG. 14 illustrates the high-resolution XPS spectra of F is in (a) V—$Co(OH)_2$-8, (b) V—$Co(OH)_2$-12, (c) V—$Co(OH)_2$-2 h, (d) V—$Co(OH)_2$-4 h, (e) with NaF.
Figure 15:
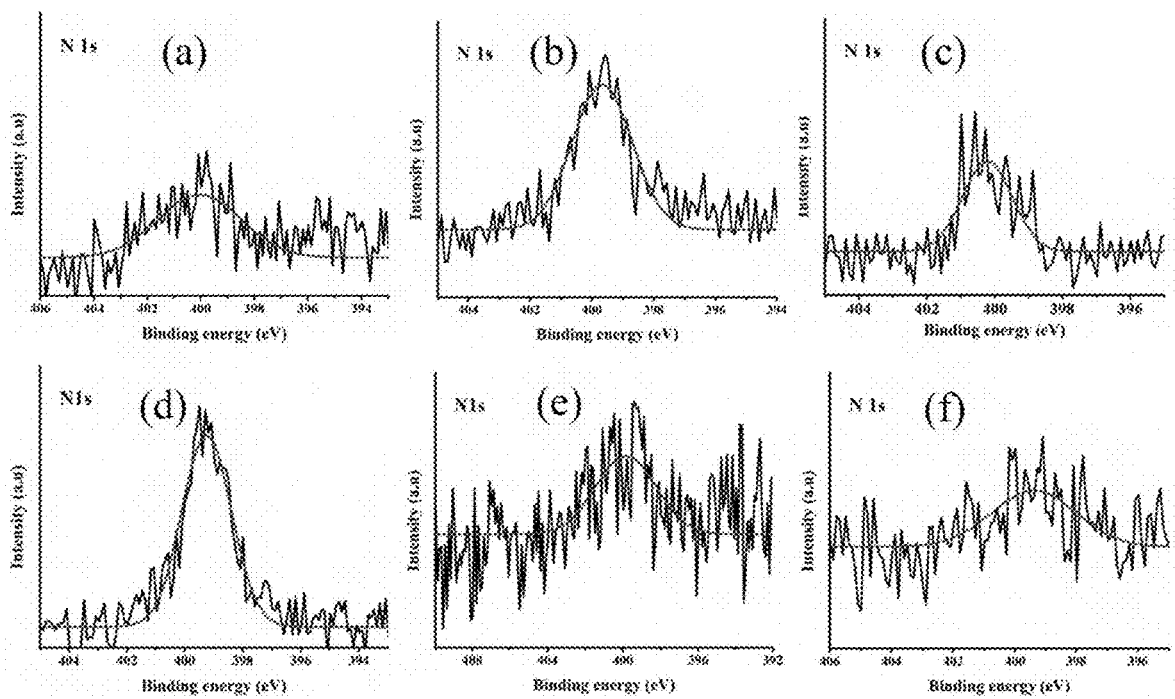
FIG. 15 illustrates the high-resolution XPS spectra of N 1s in (a) V—$Co(OH)_2$-8, (b) V—$Co(OH)_2$-12, (c) V—$Co(OH)_2$-2 h, (d) V—$Co(OH)_2$-4 h, (e) V—$Co(OH)_2$ without $NH_4F$ and (f) V—$Co(OH)_2$ with NaF.

X-ray photoelectron spectroscopic (XPS) analysis was performed to establish the elemental composition and oxidation states as well as to understand the effect of V and F doping on the electronic properties of Co(OH)$_2$. The pure Co(OH)$_2$ core level Co 2p XPS spectrum showed two spin-orbit doublets accompanied by two shakeup satellites, indicating the coexistence of Co$^{2+}$ and Co$^{3+}$ oxidation states (FIG. 11(a)). The O 1s XPS spectrum of Co(OH)$_2$ are corresponding to metal-O bond, oxygen vacancies and lattice hydroxyl group (FIG. 11(b)). The Co 2p XPS core spectrum of V—Co(OH)$_2$ also fitted into two spin-orbit doublets accompanied by their corresponding satellite peaks, suggesting the coexistence of Co$^{2+}$/Co$^{3+}$ oxidation state (FIG. 11(d)). The O 1s XPS spectrum of V—Co(OH)$_2$ showed metal-O bond (V—O and Co—O), oxygen vacancies and lattice hydroxyl group (FIG. 11(e)). V 2p spectrum of V—Co(OH)$_2$ fitted into rare less stable V$^{4+}$ and V$^{5+}$ oxidation states (FIG. 11(g)). F is XPS spectrum revealed single strong peat at 683.6 eV in both the catalysts that indicated existence of F in completely ionic state (FIGS. 11(c), (f)). N doping in Co(OH)$_2$ as well as V—Co(OH)$_2$ was confirmed by the presence of peak at 400.5 eV in N 1s XPS spectra (FIGS. 11(h), (i)). V—Co(OH)$_2$-8, V—Co(OH)$_2$-12, V—Co(OH)$_2$-2 h, V—Co(OH)$_2$-4 h, V—Co(OH)$_2$ without NH$_4$F and V—Co(OH)$_2$ with NaF clearly confirmed the coexistence of Co$^{2+}$ and Co$^{3+}$ oxidation state (FIG. 12, Table 2). O 1s XPS spectra of all the samples showed peaks corresponding to metal-O bond (V—O and Co—O), oxygen vacancies and lattice hydroxyl group (FIG. 13). The presence of free ionic F was confirmed from F is XPS spectra in all catalysts except in V—Co(OH)$_2$ fabricated without using NH$_4$F (FIGS. 14(a)-(e)). V 2p XPS spectra clearly indicated the presence of V$^{4+}$ and V$^{5+}$ states in all catalysts (FIG. 8, Table 2). Further, N 1s XPS spectra suggested the doping of N in all catalysts due to urea/NH$_4$F usage while fabrication (FIGS. 15(a)-(f)).

TABLE 2

Comparison of Co 2p and V 2p binding energy (B.E) values in different catalysts.

| Catalyst | B.E (eV) Co$^{2+}$ | B.E (eV) Co$^{3+}$ | B.E (eV) V$^{4+}$ | B.E (eV) V$^{5+}$ |
|---|---|---|---|---|
| Co(OH)$_2$ | 797.95 | 795.99 | | |
|  | 782.1 | 789.95 | | |
| V—Co(OH)$_2$-8 | 798.45 | 796.02 | 516.75 | 517.85 |
|  | 782.43 | 780.5 | | |
| V—Co(OH)$_2$-10 | 798.3 | 796.01 | 516.57 | 517.75 |
|  | 782.27 | 780.5 | | |
| V—Co(OH)$_2$-12 | 798.6 | 796.8 | 516.38 | 517.29 |
|  | 782.9 | 781.0 | | |
| V—Co(OH)$_2$-2 h | 798.38 | 795.98 | 516.12 | 517.87 |
|  | 782.32 | 780.47 | | |
| V—Co(OH)$_2$-4 h | 798.04 | 796.3 | 516.17 | 517.16 |
|  | 781.6 | 780.2 | | |
| V—Co(OH)$_2$ (without NH$_4$F) | 798.3 | 796.7 | 516.62 | 517.94 |
|  | 782.01 | 780.06 | | |
| V—Co(OH)$_2$—NaF | 798.5 | 796.8 | 516.17 | 517.15 |
|  | 782.02 | 780.5 | | |
| V—Co(OH)$_2$-after OER | 798.14 | 796.46 | 516.5 | 517.36 |
|  | 781.99 | 780.55 | | |

Example 5

Electrocatalytic Studies

The electrocatalytic OER studies for Co(OH)$_2$ and V—Co(OH)$_2$ coated on carbon cloth (CC) was studied using linear sweep voltammetry (LSV) at 1.0 M alkaline medium (pH=14.0) through a standard three electrode cell.

The bare carbon cloth (CC) did not show any OER activity. But Co(OH)$_2$ and V—Co(OH)$_2$ exhibited higher OER activity compared to commercial RuO$_2$. Particularly, V—Co(OH)$_2$ showed extraordinarily low overpotential (136 mV) for achieving benchmark current density of 10 mA cm$^{-2}$ (FIG. 16(a)). The undoped Co(OH)$_2$, and commercial RuO$_2$ electrodes required 340 and 364 mV for producing 10 mA cm$^{-2}$ current density, respectively. Thus V—Co(OH)$_2$ outperformed the most of the reported highly OER active transition metal catalyst that includes hydroxides and oxyhydroxides.

Figure 17:
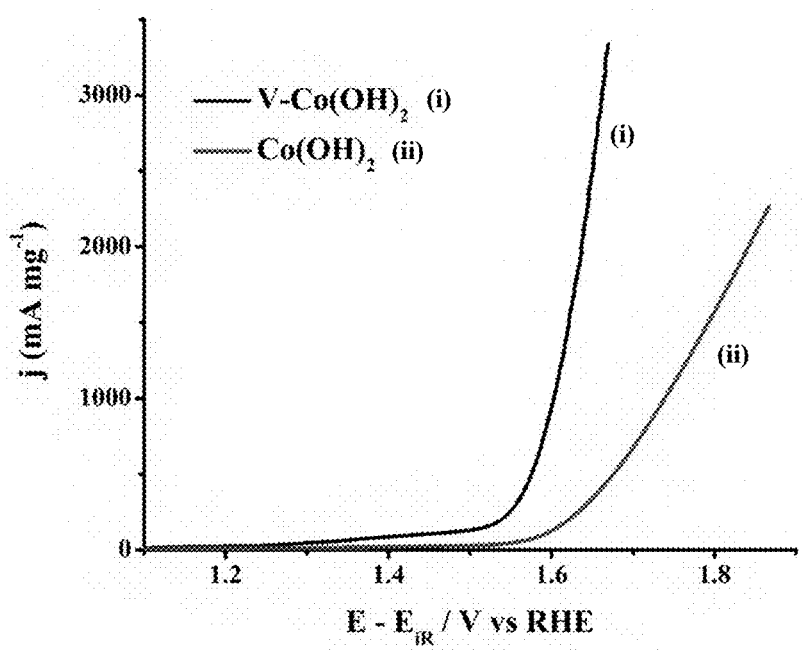
FIG. 17 illustrates mass activity of undoped $Co(OH)_2$ and V—$Co(OH)_2$ catalysts.

V—Co(OH)$_2$ also showed relatively higher mass activity compared to undoped Co(OH)$_2$ and commercial RuO$_2$ (FIG. 17). The undoped Co(OH)$_2$ showed mass activity of 35.2 mA/mg whereas V—Co(OH)$_2$ exhibited 176.2 mA/mg.

Figure 16:
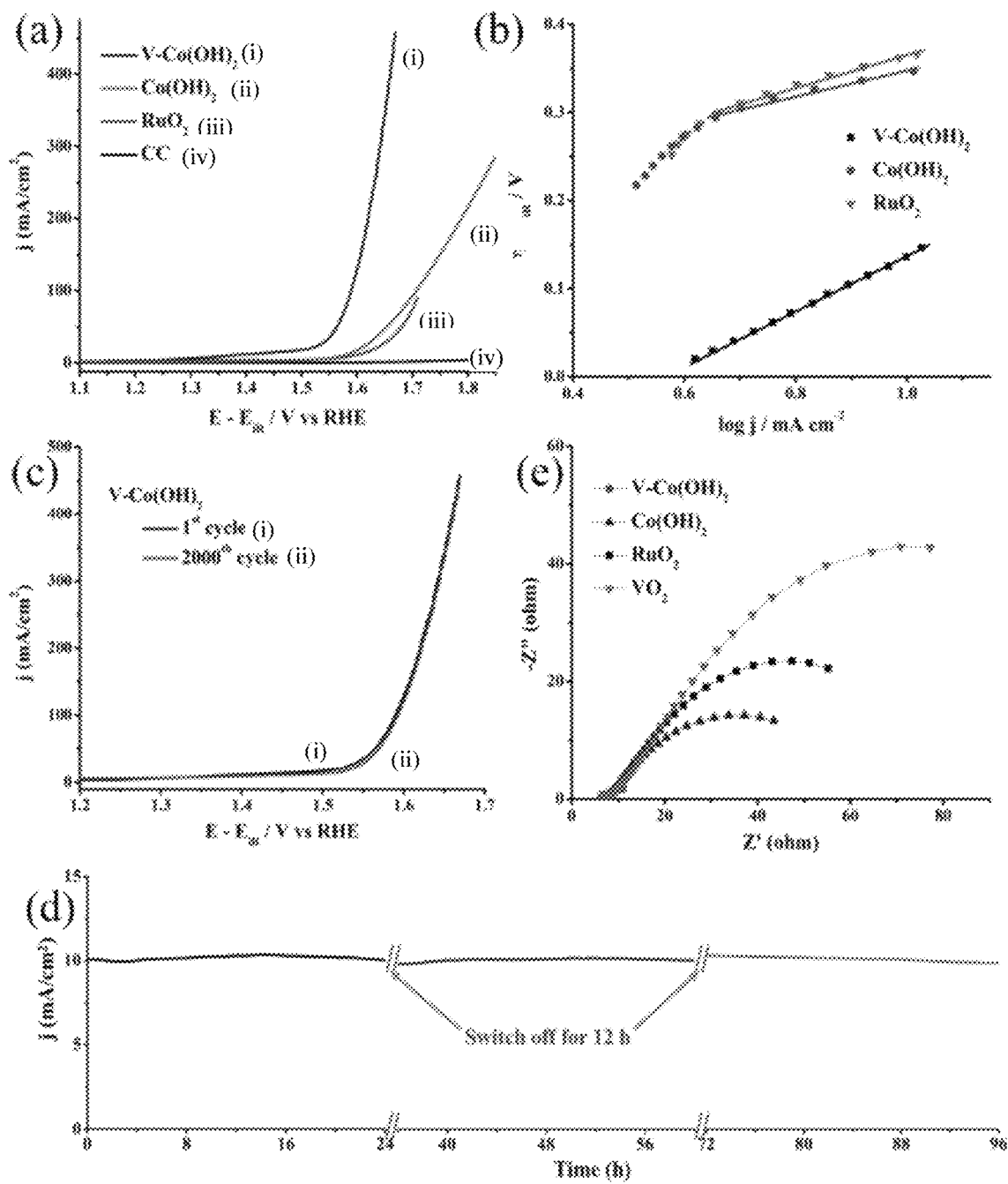
FIG. 16 illustrates (a) OER polarization curves (scan rate 1 mV/s), (b) Tafel slopes and (e) electrochemical impedance spectra of $Co(OH)_2$ and V—$Co(OH)_2$, (c), (d) stability studies of V—$Co(OH)_2$. (c) OER curve of V—$Co(OH)_2$ after $1^{st}$ and $2000^{th}$ cycles showed the same activity and (d) Chronoamperometric curves of V—$Co(OH)_2$, three 24 h measurements were performed after the gap of 12 h.

Furthermore, V—Co(OH)$_2$ also exhibited lowest Tafel slope (47.2 mV/dec) compared to Co(OH)$_2$ (83.1 mV/dec) and commercial RuO$_2$ (87.5 mV/dec) catalysts, suggesting V—Co(OH)$_2$ catalyst has the fastest reaction kinetics (FIG. 16(b)).

The stability studies of V—Co(OH)$_2$ electrodes showed negligible change of current density after 2000 cycles (FIG. 16(c)). Further, the chronoamperometric response performed at a stable test environment (1.0 M KOH, a current density of 10 mA cm$^{-2}$ and room temperature) revealed a very little change over 72 h and demonstrated excellent stability (FIG. 16(d)). The chronoamperometric test was performed for three 24 h periods with 12 h intervals. All three 24 h periods, V—Co(OH)$_2$ electrodes exhibited insignificant change from 10 mA cm$^{-2}$ current density. Electrochemically active surface area (ECSA) for Co(OH)$_2$ and V—Co(OH)$_2$ was calculated based on the linearly proportional between the ECSA and electrochemical double layer capacitances (Cal).

Figure 18:
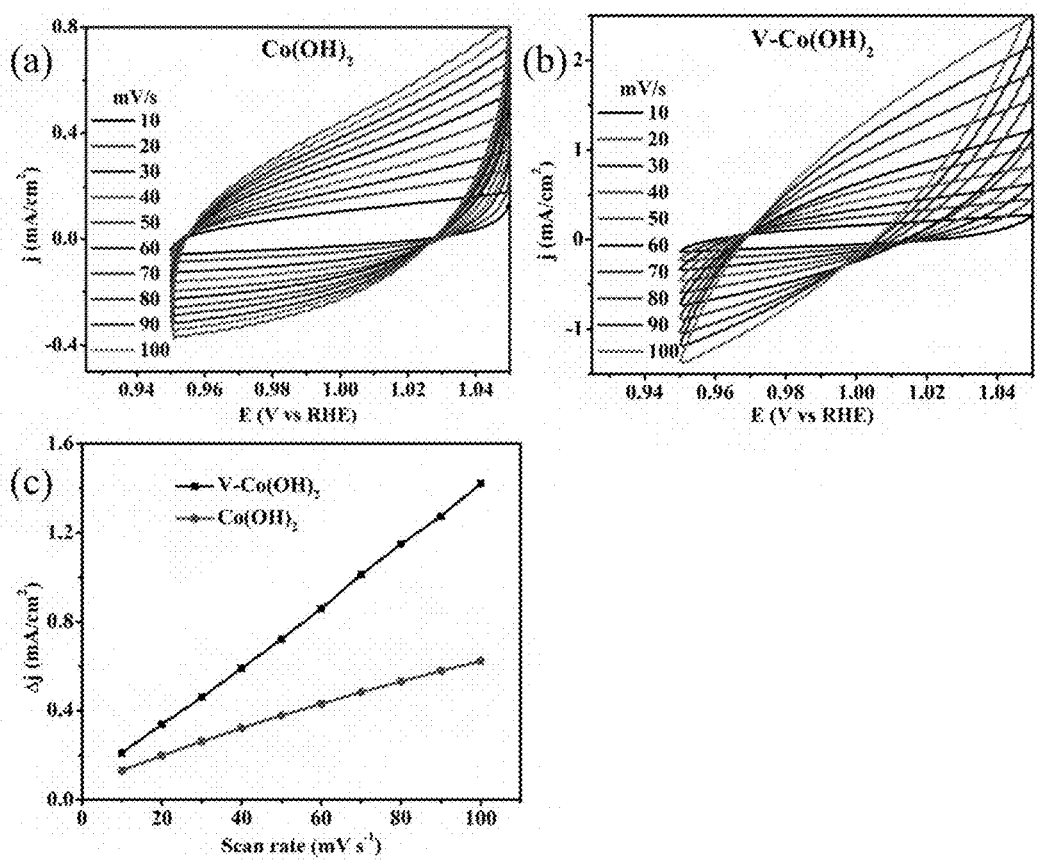
FIG. 18 illustrates (a), (b) double layer capacitance and (c) capacitive currents as a function of scan rate.

Nonfaradaic region of undoped and V-doped $Co(OH)_2$ catalysts are shown in FIGS. 18(a), (b). The slopes obtained from the linear relationship of the current density differences ($J_{anode}-J_{cathode}$) Vs the scan rate indicated high active sites in V—$Co(OH)_2$ compared to $Co(OH)_2$ (FIG. 18c). V—Co $(OH)_2$ showed significantly higher $C_{dl}$ (9.7 $mF/cm^2$) and ECSA (242.5) compared to undoped $Co(OH)_2$ ($C_{dl}$=3.1 $mF/cm^2$, ECSA=77.5).

Electrochemical impedance (EIS) measurement was measured for $Co(OH)_2$, V—$Co(OH)_2$ and commercial $RuO_2$ catalysts to gain insight on the electrochemical reaction kinetics. The results of EIS are shown in FIG. 16(e) that revealed very low charge transfer resistance for V—Co $(OH)_2$ compared to $Co(OH)_2$ and $RuO_2$ and facilitated enhanced catalytic activity.

Figure 19:
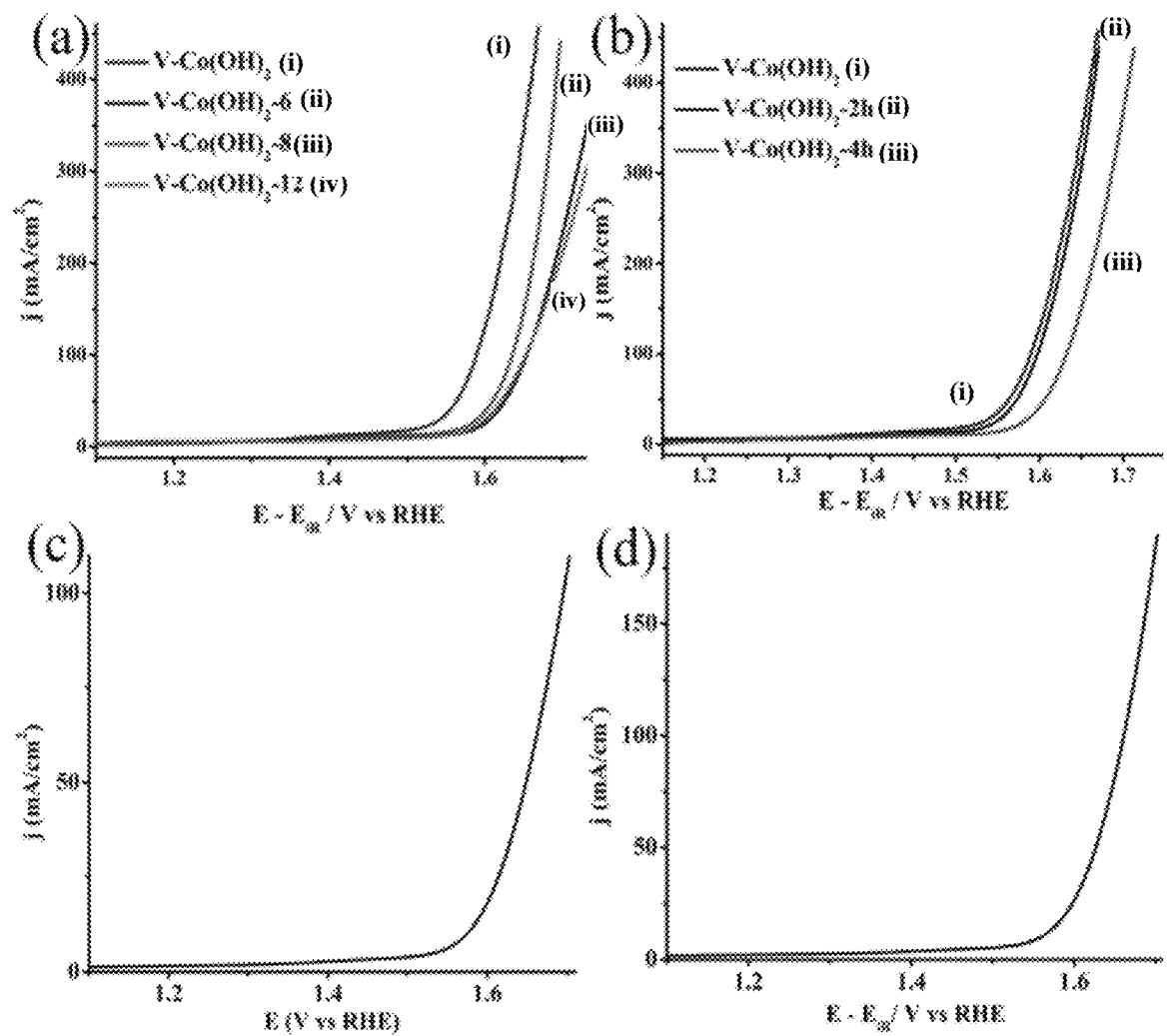
FIG. 19 illustrates OER polarization curves (a) V—$Co(OH)_2$ with vanadium at different ratio, (b) V—$Co(OH)_2$ fabricated at different reaction time, (c) V—$Co(OH)_2$ fabricated without $NH_4F$ and (d) V—$Co(OH)_2$ fabricated using NaF.

The comparison of OER activity with all synthesized catalysts revealed that V—$Co(OH)_2$ prepared using 10 wt % of vanadium precursors exhibited highest OER activity (FIG. 19(a)). V—$Co(OH)_2$-6 required 240 mV to produce 10 mA $cm^{-2}$ whereas V—$Co(OH)_2$-8 displayed strongly enhanced OER activity, requiring only 178 mV to achieve 10 mA $cm^{-2}$ current density. However, OER activity of V—$Co(OH)_2$-12 showed comparatively low OER activity, requiring 291 mV to reach 10 mA $cm^{-2}$ current density. V—$Co(OH)_2$-2 h and V—$Co(OH)_2$-4 h catalysts required overpotential of 169 and 247 mV to produce 10 mA $cm^{-2}$ current density (FIG. 19(b)), thus suggesting that V—Co $(OH)_2$ prepared by 3 h heating is the best OER active catalyst. V—$Co(OH)_2$ fabricated without using $NH_4F$ as well as with NaF instead of $NH_4F$ also showed very low OER activity (FIGS. 19(c), (d)). These results suggest $NH_4F$ precursor plays significant role on the nanostructure formation with higher catalytic sites apart from F doping. Further, V as well as F codoping is important for enhancing the OER activity of V—$Co(OH)_2$ catalyst.

ADVANTAGES OF THE PRESENT INVENTION

The present invention provides an efficient earth-abundant electrocatalyst for oxygen evolution reaction.

The present invention provides V—$Co(OH)_2$ nanowires electrocatalysts which produces excellent OER activity with ultralow overpotential of 136 mV at 10 mA $cm^{-2}$ (scan rate 1 m V/s), small Tafel slope (47.2 mV/dec) and good stability over 72 h.

The present invention provides a simple, easy single step fabrication of $V^{4+}$ and F-codoped $\beta$-$Co(OH)_2$ nanowires electrocatalysts.

REFERENCES

1. L. Li, P. Wang, Q. Shao and X. Huang, X. Recent Progress in Advanced Electrocatalyst Design for Acidic Oxygen Evolution Reaction, Adv. Mater. 2021 2004243 (1-24).
2. (2) S. Choi, Y. Park, H. Yang, H. Jin, G. M. Tomboc and K. Lee, K. Vacancy-engineered catalysts for water electrolysis, CrystEngComm, 2020, 22, 1500-1513.
3. (3) Y. Jiao, Y. Zheng, M. Jaroniec, S. Z. Qiao, Design of electrocatalysts for oxygen- and hydrogen-involving energy conversion reactions, Chem. Soc. Rev. 2015, 44, 2060-2086.
4. (4) F. Wang, T. A. Shifa, X. Zhan, Y. Huang, K. Liu, Z. Cheng, C. Jiang, J. He, Nanoscale, Recent advances in transition-metal dichalcogenide based nanomaterials for water splitting, 2015, 7, 19764-19788.
5. (5) H. Yang, H. Sun, X. Fan, X. Wang, Q. Yang, X. Lai, Hollow Co3O4 dodecahedrons with controlled crystal orientation and oxygen vacancies for the high performance oxygen evolution reaction, Mater. Chem. Front. 2021, 5, 259-267.
6. (6) Z. Chen, L. Cai, X. Yang, C. Kronawitter, L. Guo, S. Shen, B. E. Koel, Reversible Structural Evolution of NiCoOxHy during the Oxygen Evolution Reaction and Identification of the Catalytically Active Phase, ACS Catal. 2018, 8, 1238-1247.
7. (7) Y. Liu, L. P. Liu, L. J. Cao, C. Q. Shang, Z. Y. Wang, H. E. Wang, L. Q. He, J. Y. Yang, H. Cheng, J. Z. Li, Z. G. Lu, Mater. Chem. Front. 2017, 1, 2495-2510.
8. (8) P. Li, X. Duan, Y. Kiang, Y. Li, G. Zhang, W. Liu, X. Sun, Tuning Electronic Structure of NiFe Layered Double Hydroxides with Vanadium Doping toward High Efficient Electrocatalytic Water Oxidation, Adv. Energy Mater. 2018, 8, 1703341.
9. (9) Y. Cui, Y. Xue, R. Zhang, J. Zhang, X. Li, X. Zhu, Vanadium-cobalt oxyhydroxide shows ultralow overpotential for the oxygen evolution reaction, J. Mater. Chem. A 2019, 7, 21911-21917.
10. (10) H. Huang, Y. Li, W. Li, S. Chen, C. Wang, M. Cui, T. Ma, Enhancing oxygen evolution reaction electrocatalytic performance with vanadium-doped Co/CoO encapsulated in carbon nanorod, Inorg. Chem. Commun. 2019, 103, 1-5.
11. (11) S. Anantharaj, K. Karthick, P. Murugan, S. Kundu, V3+ Incorporated $\beta$-$Co(OH)_2$: A Robust and Efficient Electrocatalyst for Water Oxidation, Inorg. Chem. 2020, 59, 730-740.

What is claimed is:

1. A vanadium and fluorine codoped cobalt hydroxide nanowires electrocatalyst V—$Co(OH)_2$ comprising of vanadium (V) at less stable 4+ oxidation state and fluorine (F) ions codoped $\beta$-$Co(OH)_2$ nanowires directly on the carbon cloth electrode; wherein the V—$Co(OH)_2$ electrocatalyst possesses hybrid nanostructures comprising nanowires attached with spherical nano-assemblies.

2. The V—$Co(OH)_2$ electrocatalyst of claim 1, wherein the V—$Co(OH)_2$ electrocatalyst possesses mixed state of cobalt ($Co^{2+}$/$Co^{3+}$), wherein, $Co^{2+}$ is at a higher ratio as compared to $Co^{3+}$.

3. The V—$Co(OH)_2$ electrocatalyst of claim 1, wherein the V—$Co(OH)_2$ electrocatalyst produces low Tafel slope and charge transfer resistance.

4. The V—$Co(OH)_2$ electrocatalyst of claim 1, wherein the V—$Co(OH)_2$ electrocatalyst requires overpotential of 136 mV for achieving geometric current density of 10 $mA/cm^2$.

5. The V—$Co(OH)_2$ electrocatalyst of claim 1, wherein the V—$Co(OH)_2$ electrocatalyst possesses stability over 72 h.

6. The V—$Co(OH)_2$ electrocatalyst of claim 1, wherein the V—$Co(OH)_2$ electrocatalyst exhibits oxygen evolution reaction (OER) activity in alkaline conditions at pH 14.0.

7. A method for fabrication of V and F-codoped nanowires electrocatalyst V—$Co(OH)_2$ comprising vanadium (V) at less stable 4+ oxidation state and fluoride (F) ions directly on carbon cloth electrode by hydrothermal reaction, the method comprising: dissolving cobalt nitrate hexahydrate and urea in water and stirring for about 5 minutes to about 10 minutes at room temperature, adding ammonium metavanadate and 2 equivalent ammonium fluoride to the solution under stirring and heating the mixture in a pre-treated single side coated carbon cloth under pressure at a temperature in a range of about 120° C. to about 220° C. for a period of about 2h to about 4h, cooling the reaction solution to room temperature slowly and taking out carbon cloth and washing with water ethanol, and acetone to obtain V and F-codoped V—Co(OH)$_2$.

8. The method of claim 7, wherein the ammonium metavanadate is used at a concentration of 6% to 12 by wt. %.

* * * * *